(12) United States Patent
Martindale et al.

(10) Patent No.: US 8,573,254 B2
(45) Date of Patent: Nov. 5, 2013

(54) ELASTOMERIC FLOW CONTROL DEVICE FOR A BAR GUN MANIFOLD

(75) Inventors: Richard A. Martindale, Vacaville, CA (US); Mojtaba Valiyee, Moraga, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 471 days.

(21) Appl. No.: 12/871,739

(22) Filed: Aug. 30, 2010

(65) Prior Publication Data

US 2011/0057134 A1 Mar. 10, 2011

Related U.S. Application Data

(60) Provisional application No. 61/238,054, filed on Aug. 28, 2009.

(51) Int. Cl.
*F16K 11/22* (2006.01)
*F16K 5/04* (2006.01)

(52) U.S. Cl.
USPC .............. 137/597; 251/88; 251/274; 251/312

(58) Field of Classification Search
USPC ............................. 137/597; 251/88, 274, 312
See application file for complete search history.

(56) References Cited

U.S. PATENT DOCUMENTS

| | | | |
|---|---|---|---|
| 2,494,091 A * | 1/1950 | Harris, Jr. ................. | 137/625.42 |
| 3,035,640 A * | 5/1962 | Gibson et al. ................... | 166/70 |
| 3,257,096 A * | 6/1966 | Floren et al. ................... | 251/287 |
| 3,730,222 A | 5/1973 | Moen | |
| 3,799,499 A * | 3/1974 | Shur .............................. | 251/290 |
| 3,815,871 A * | 6/1974 | Carlson ......................... | 251/310 |
| 4,015,816 A * | 4/1977 | Semon .......................... | 251/285 |
| 4,141,538 A * | 2/1979 | Bake et al. ............... | 251/315.14 |
| 4,217,925 A * | 8/1980 | Clark ............................. | 137/385 |
| 4,239,185 A * | 12/1980 | Lowe ............................. | 251/164 |
| 4,535,969 A * | 8/1985 | Riley ............................. | 251/215 |
| 4,609,177 A * | 9/1986 | Turner et al. ................... | 251/175 |
| 4,794,944 A * | 1/1989 | Henry ........................... | 137/312 |
| 4,986,449 A | 1/1991 | Valiyee et al. | |
| 5,044,606 A * | 9/1991 | Wordin ......................... | 277/522 |
| 5,137,048 A | 8/1992 | Brattoli | |
| 6,322,051 B1 | 11/2001 | Salmela | |
| 6,877,523 B2 | 4/2005 | Dempsey et al. | |
| 7,506,665 B2 | 3/2009 | Gruener, Sr. | |
| 2007/0204924 A1 | 9/2007 | Delgiacco et al. | |

* cited by examiner

*Primary Examiner* — John Fox
(74) *Attorney, Agent, or Firm* — Kilpatrick Townsend & Stockton LLP

(57) ABSTRACT

A flow control device for a bar gun manifold. The flow control device includes a sleeve and an actuating member. The sleeve is monolithically formed of an elastomeric material. The sleeve includes a cylindrical outer surface, a through hole oriented transverse to the sleeve axis of rotation, a first raised portion that encircles the sleeve and is shaped to provide a seal between the sleeve and the manifold body, and a first interface shaped to connect the sleeve to the actuating member. The actuating member includes a second interface shaped to interface with the first interface. The first and second interfaces are shaped to transfer rotation of the actuating member about the sleeve axis of rotation to the sleeve to reorient the through hole relative to a fluid passage of the manifold body.

18 Claims, 6 Drawing Sheets

FIG. 1 --PRIOR ART--

--PRIOR ART--

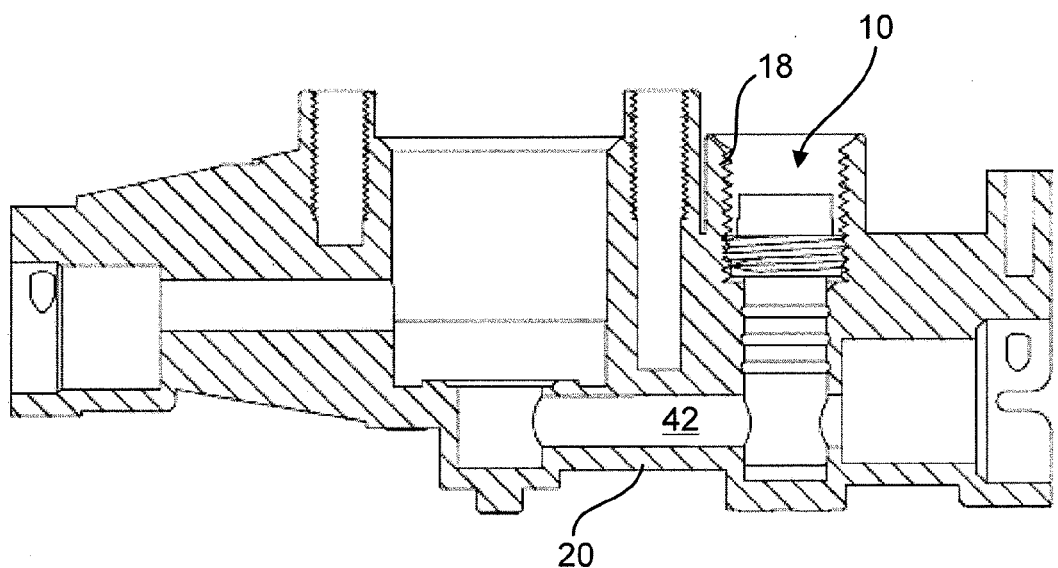
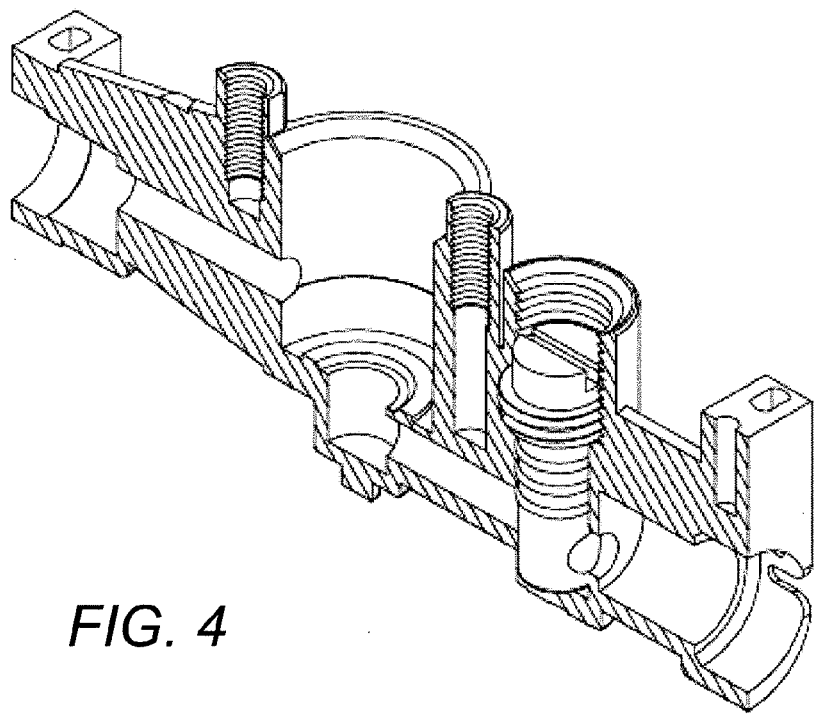
FIG. 4

ELASTOMERIC FLOW CONTROL DEVICE FOR A BAR GUN MANIFOLD

CROSS-REFERENCES TO RELATED APPLICATIONS

This application claims the benefit of U.S. Provisional Application Ser. No. 61/238,054, entitled "Elastomeric Flow Control Device for a Bar Gun Manifold," filed Aug. 28, 2009, the entire disclosure of which is hereby incorporated herein by reference.

BACKGROUND

The present invention relates to a beverage dispensing apparatus of the type in which any one of several different beverages can be dispensed from a single beverage dispensing head by pressing a corresponding button. In particular, the present invention is related to flow control and shut-off devices used in a flow control manifold of such a beverage dispensing apparatus.

Hand-held beverage dispensers that provide the ability to dispense any of a number of different beverages by merely pressing a corresponding button are known. Such hand-held dispensers are sometimes referred to as bar guns. One such bar gun system is described in the assignee's issued U.S. Pat. No. 4,986,449, entitled: "Beverage Dispensing Apparatus," the entire disclosure of which is hereby incorporated herein by reference.

Such bar guns typically include an upstream manifold having flow control elements and may also include flow regulators to regulate the flow rate of the beverage(s) through the beverage dispenser. The beverage dispenser can be hand-held or it can be in the form of a tower. A known beverage dispensing manifold is shown in FIG. 1. Illustrated in FIG. 1, is a one-piece shut-off screw (PM10-8) made of a polypropylene material disposed proximally to the inlets of the manifold. A typical manifold has a plurality of such shut-off screws, one for each flow channel. Typically, the shut-off screws may be rotated 90 degrees so as to stop product flow to the bar gun for, for example, servicing of the bar gun.

Also shown in FIG. 1, is a similar-looking flow control valve (lower part of FR-31), commonly referred to as a Brix valve or a Brix screw. In order for these valves and screws to control the flow and seal the screw chamber to prevent leakage, an o-ring is used in combination with the valve and the screw (e.g., see PM10-6). FIG. 2 illustrates a more detailed view of the known shut-off screw (PM10-8) and its associated o-ring (PM10-6). FIG. 2 also shows the o-ring when assembled with the shut-off screw. As is shown in FIG. 2, the shut-off screw has a necked-down portion to accommodate the o-ring. This reduced diameter portion can significantly weaken the part and render it more prone to twisting apart under abuse or when the shut-off screw is installed in the manifold with a high interference fit. The Brix valve, although lacking a through hole like the shut-off valve, also suffers from similar problems due to also having a necked-down portion used to accommodate an o-ring. Furthermore, the known flow control/shut-off device is made of polypropylene. As such, the part can get slightly deformed or compressed during its assembly with the manifold body, as the part is commonly made a bit oversized. During its use, the part can shrink or otherwise become deformed to such an extent that is does not provide a reliable leak-proof seal under standard operating pressures.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention provides an improved flow control device for a bar gun manifold. The flow control device includes a relatively rigid actuating member that is coupled with an elastomeric (e.g., Santoprene™) sleeve having one or more raised portions that encircle the sleeve and are shaped to provide a seal between the sleeve and the bar gun manifold body. Advantageously, the elastomeric sleeve provides a more positive sealing solution than the present (harder plastic) device and eliminates the need for a separate o-ring. The same approach can also used to make the Brix valve, that is, it can be made of a relatively rigid actuating member that is coupled with an elastomeric (e.g., Santoprene™) sleeve having one or more raised portions that encircle the sleeve and are shaped to provide a seal between the sleeve and the bar gun manifold body.

Thus, in one aspect, a flow control device is provided for a flow control manifold assembly having a manifold body. The flow control device includes a sleeve and an actuating member. The sleeve is monolithically formed of an elastomeric material. The sleeve includes a cylindrical outer surface, a sleeve axis of rotation concentric with the cylindrical outer surface, a through hole oriented transverse to the sleeve axis of rotation, a first raised portion that encircles the sleeve and is shaped to provide a seal between the sleeve and the manifold body, and a first interface shaped to connect the sleeve to the actuating member. The actuating member includes a second interface shaped to interface with the first interface of the sleeve. The first and second interfaces are shaped to transfer rotation of the actuating member about the sleeve axis of rotation to the sleeve to reorient the through hole relative to a fluid passage of the manifold body.

The sleeve can include additional raised portions that provide a seal between the sleeve and the manifold body. For example, the sleeve can further include a second raised portion that encircles the sleeve and is shaped to provide a seal between the sleeve and the manifold body. And the sleeve can further include a third raised portion that encircles the sleeve and is shaped to provide a seal between the sleeve and the manifold body.

In many embodiments, the first interface is configured as a female coupler and the second interface is configured as a male coupler. For example, the second interface can include a cylindrical outer surface and an elongated recess shaped to interface with a complementary-shaped raised surface of the first interface. The raised surface of the first interface can extend parallel to the sleeve axis of rotation. The second interface can include a plurality of elongated recesses, and each of the elongated recesses can be shaped to interface with a corresponding complementary-shaped raised surface of the first interface. The second interface can extend within the sleeve along the sleeve axis of rotation to a position transverse to or beyond the through hole when the actuating member is connected to the sleeve. The first and second interfaces can accommodate the through hole such that the through hole is not in fluid communication with the first and second interfaces. The second interface can extend to or beyond the through hole on two sides of the through hole.

The actuating member can include a male threaded portion that is configured to interface with a corresponding female threaded portion of the manifold body. The male threaded portion can be concentric with the sleeve axis of rotation when the actuating member is connected to the sleeve.

The actuating member can include a recessed drive feature shaped to interface with a tool so that the actuating member can be rotated about the sleeve axis of rotation via the tool. For example, the recessed drive feature can be shaped to interface with a flat-bladed screw driver.

The actuating member can also be configured to be grasped to impart rotation to the actuating member to reorient the through hole relative to the fluid passage of the manifold body. For example, the actuating member can have an elongated shape having a distal end portion and a proximal end portion. The second interface can be formed at the distal end portion. And the proximal end portion can protrude from the manifold body and be shaped to be grasped to impart rotation to the actuating member to reorient the through hole relative to the fluid passage of the manifold body. For example, the proximal end portion can include a substantially rectangular tab. And the actuating member can include a feature that protrudes in a radial direction relative to the sleeve axis of rotation that interfaces with the manifold block to position the through hole relative to the fluid passage of the manifold block.

In many embodiments, the actuating member is monolithically formed of a material stiffer than the sleeve elastomeric material. For example, the actuating member can be formed of an acetal plastic.

In another aspect, a flow control manifold assembly is provided. The flow control manifold assembly includes a manifold body and a plurality of any of the flow control devices as described above. Each of the flow control devices is operable to change a fluid flow rate of a fluid flowing through a corresponding fluid passage of the manifold body.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 4 illustrates the flow control device of FIG. 3A in an open position when installed in a flow control manifold.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention can be practiced without the specific details. Furthermore, well-known features may be omitted or simplified in order not to obscure the embodiment being described.

Figure 1:
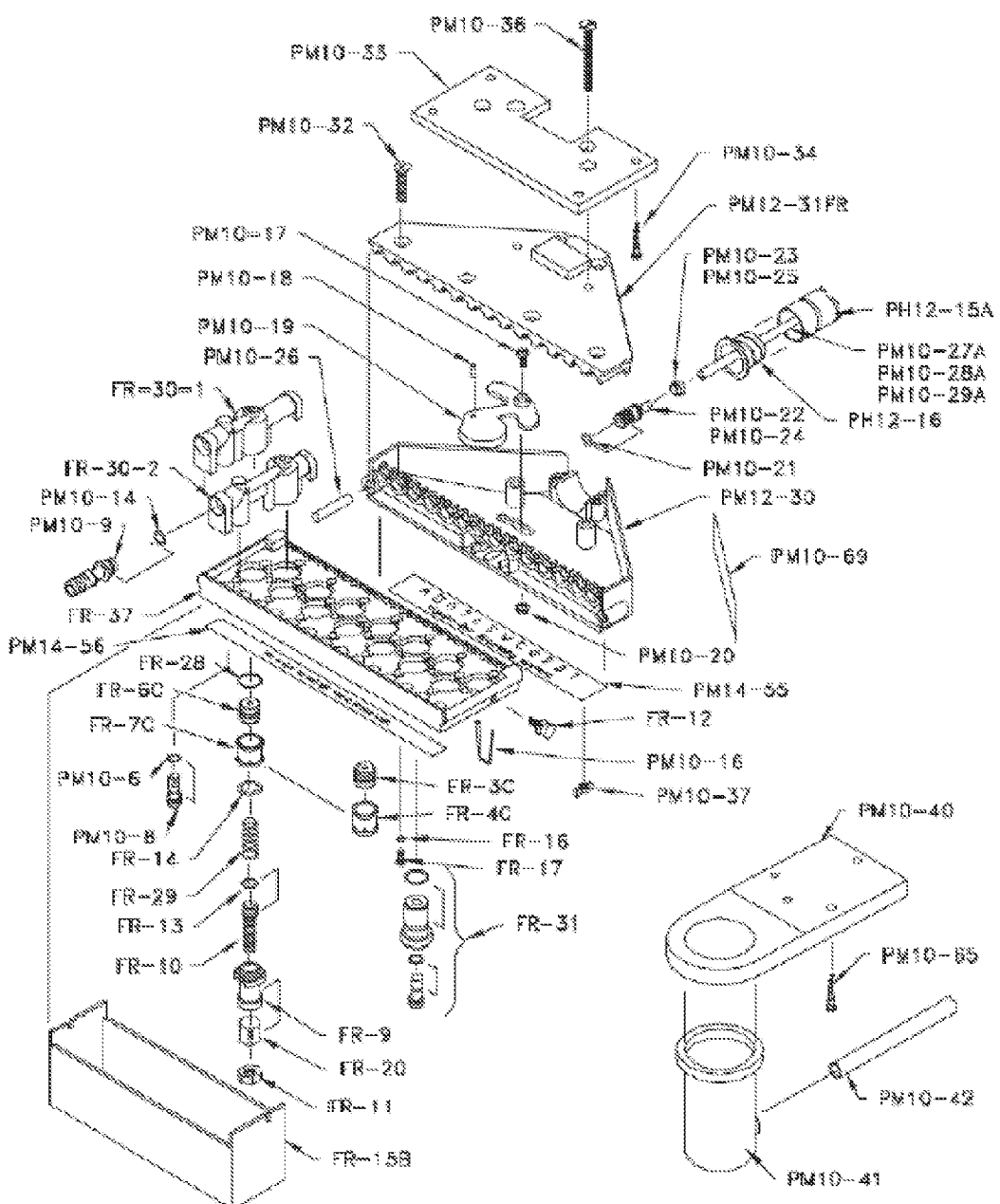
FIG. 1 is an exploded parts view drawing of a known 12/14 button post mix manifold for a beverage dispensing system.
Figure 2:
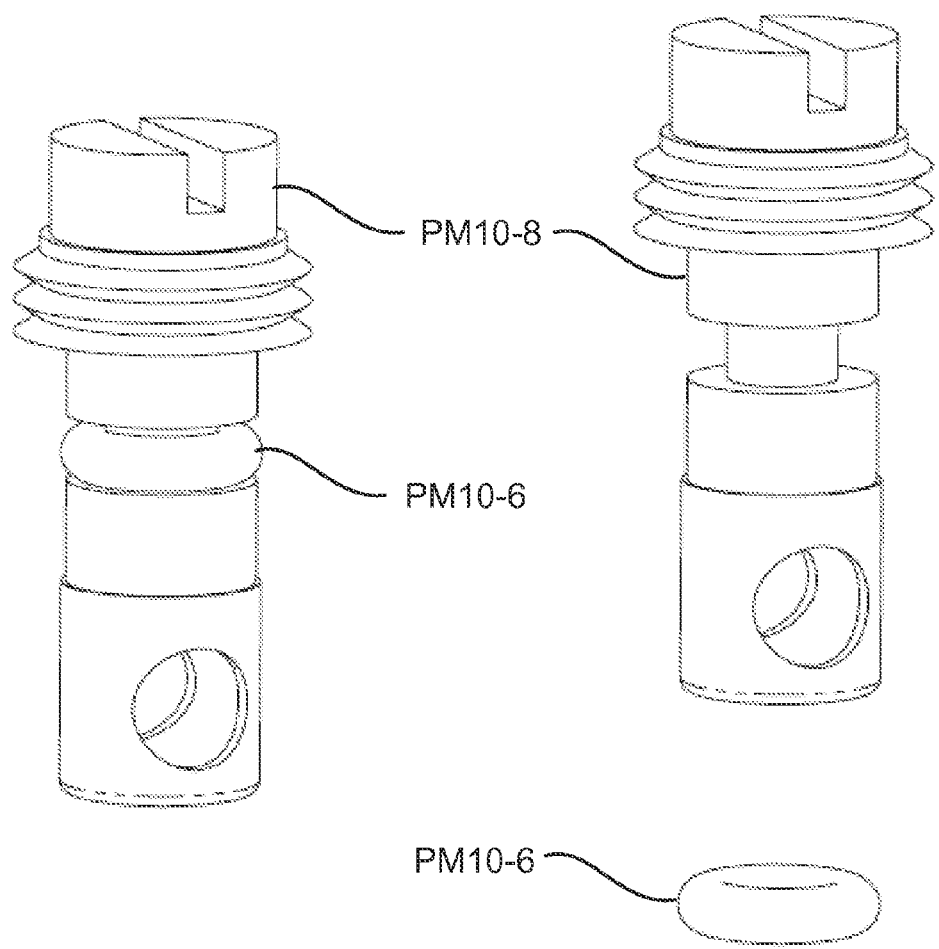
FIG. 2 shows a known shut-off screw and its associated o-ring.
Figure 3A:
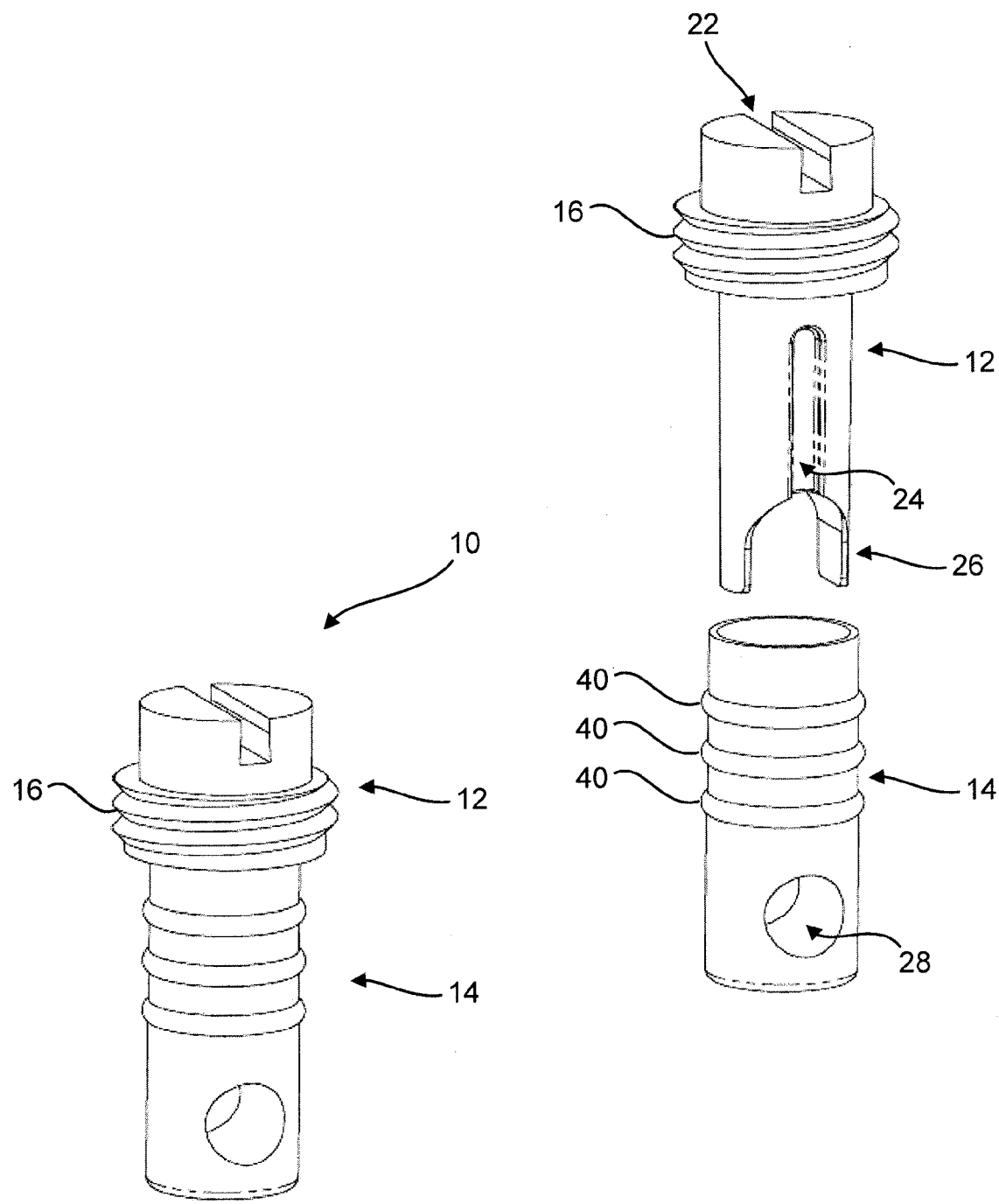
FIG. 3A shows a flow control device for a bar gun manifold in accordance with an embodiment of the present invention.

Referring now to the drawings, in which like reference numerals represent like parts throughout the several views, FIG. 3A shows a flow control device 10 for a bar gun manifold in accordance with an embodiment of the present invention. The flow control device 10 includes an actuating member 12 and a sleeve 14. The actuating member 12 is received by the sleeve 14, thereby connecting the actuating member 12 and the sleeve 14 as shown in the bottom left illustration of FIG. 3A.

Figure 5:
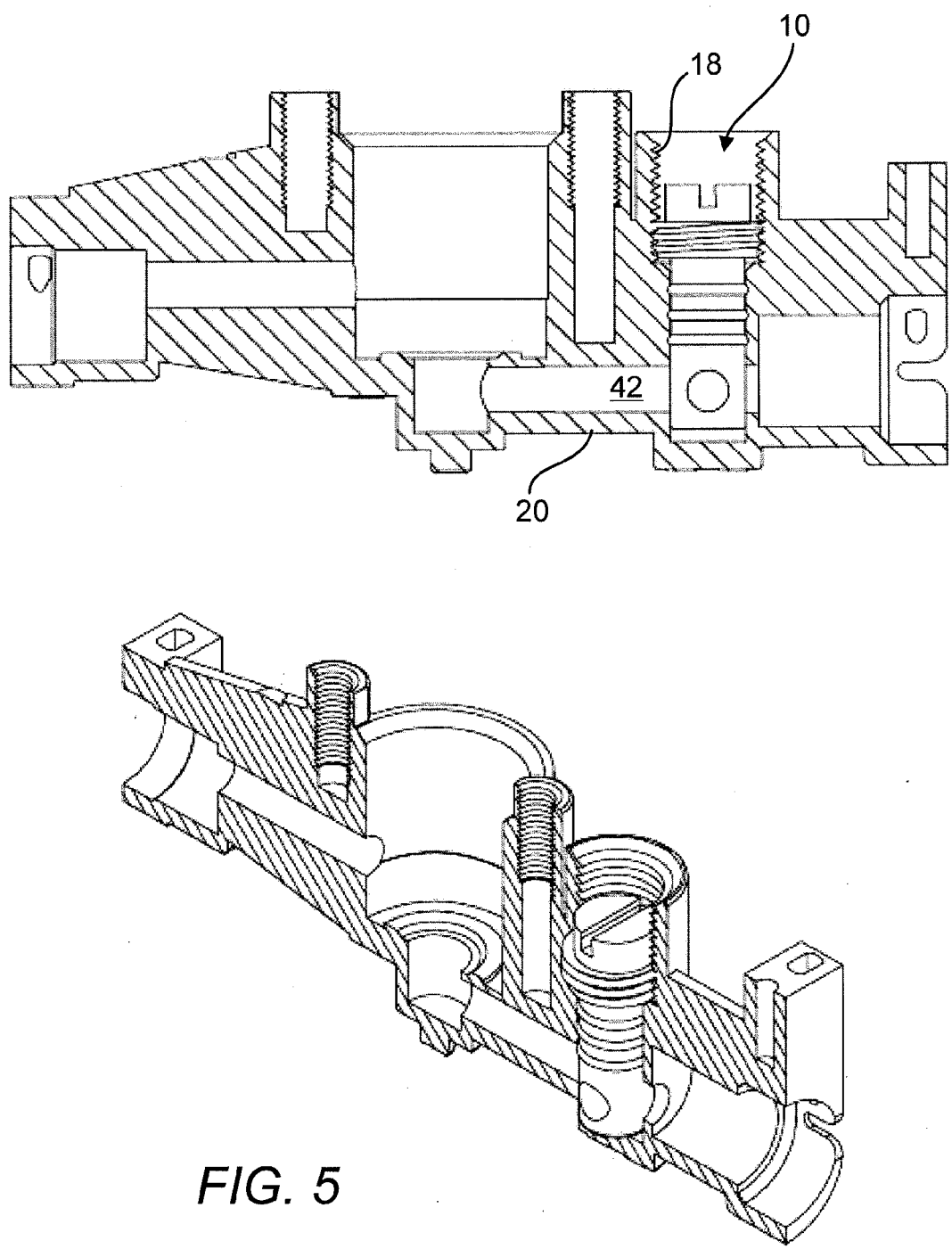
FIG. 5 illustrates the flow control device of FIG. 3A in a closed position when installed in a flow control manifold.

The actuating member 12 is made of a suitably rigid material, for example a rigid plastic material (e.g., an acetal plastic material). The actuating member 12 includes a male threaded portion 16 that engages a female threaded portion 18 of a manifold body 20 (e.g., as shown in FIGS. 4 and 5). The actuating member 12 also includes a recessed drive feature (slot 22) to receive a driving tool (e.g., a flat-bladed screw driver). The actuating member 12 also includes an elongated recess 24 that extends longitudinally along the actuating member 12. The elongated recess 24 can be shaped to engage a complementarily-shaped raised surface (not shown) formed on an inside surface of the sleeve 14 to produce a secure connection between the actuating member 12 and the sleeve 14. The actuating member 12 also includes a curved distal end portion 26 to accommodate a through hole 28 in the sleeve 14, when the actuating member 12 and the sleeve 14 are assembled.

Figure 3B:
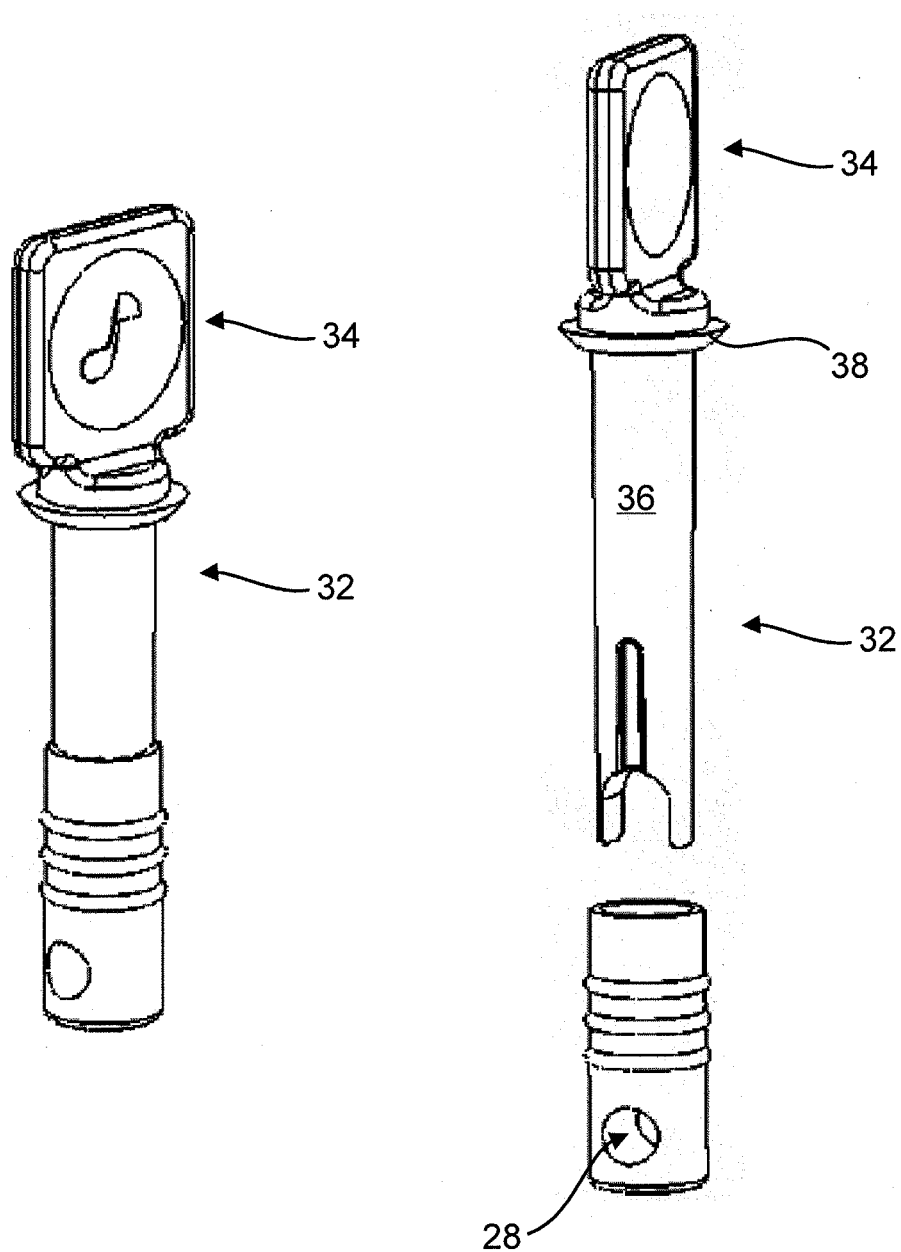
FIG. 3B shows another flow control device for a bar gun manifold in accordance with an embodiment of the present invention.

As illustrated in FIG. 3B, an actuating member 32 can include a proximal end portion 34 that protrudes from the manifold body 20 and is shaped to be grasped to allow for hand actuation of the actuating member 32 without the use of a separate driving or actuation tool. The actuating member 32 further differs from the actuating member 12 by having a longer mid portion 36 and a radial protruding feature 38 that interfaces with the manifold body 20 to position the through hole 28 relative to a corresponding fluid passage 42 of the manifold body 20. The longer mid portion 36 serves to position the proximal end portion 34 and the radial protruding feature 38 at the top of the female threaded portion 18 of the manifold body 20.

The sleeve 14 is monolithically formed of an elastomeric material (e.g., Santoprene™) The sleeve 14 elastomeric material can be less stiff and more resilient than the material used to form the actuating member 12, 32. The sleeve 14 is shaped and dimensioned to receive the lower portion of the actuating member 12. The sleeve 14 includes the through hole 28 that is selectively oriented relative to the corresponding fluid passage 42 of the manifold body 20 so as to provide flow control for the fluid in the fluid passage. The sleeve 14 also includes one or more (e.g., 3) raised portions 40 to act as integral o-ring(s) to provide a seal between the sleeve 14 and the manifold body 20.

The operation of the flow control device 10 is illustrated in FIGS. 4 and 5. FIG. 4 illustrates the flow control device 10 in an open position relative to the corresponding fluid passage 42 of the manifold body 20. FIG. 5 illustrates the flow control device 10 in a closed position relative to the corresponding fluid passage 42 of the manifold body 20.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flow control device for a flow control manifold assembly having a manifold body, the flow control device comprising:
    a sleeve monolithically formed of an elastomeric material and including
        a cylindrical outer surface,
        a sleeve axis of rotation concentric with the cylindrical outer surface,
        a through hole oriented transverse to the sleeve axis of rotation,
        a first raised portion that encircles the sleeve and is shaped to provide a seal between the sleeve and the manifold body, and
        a first interface shaped to connect the sleeve to an actuating member, wherein the first interface is configured as a female coupler; and
    the actuating member including a second interface shaped to interface with the first interface, wherein the second interface is configured as a male coupler, the first and second interfaces shaped to transfer rotation of the actuating member about the sleeve axis of rotation to the sleeve to reorient the through hole relative to a fluid passage of the manifold body;
    wherein the second interface extends within the sleeve along the sleeve axis of rotation to a position transverse to or beyond the through hole when the actuating member is connected to the sleeve; and
    wherein the first and second interfaces accommodate the through hole such that the through hole is not in fluid communication with the first and second interfaces.

2. The flow control device of claim 1, wherein the sleeve further includes a second raised portion that encircles the sleeve and is shaped to provide a seal between the sleeve and the manifold body.

3. The flow control device of claim 2, wherein the sleeve further includes a third raised portion that encircles the sleeve and is shaped to provide a seal between the sleeve and the manifold body.

4. The flow control device of claim 1, wherein:
    the second interface includes a cylindrical outer surface and an elongated recess shaped to interface with a complementary-shaped raised surface of the first interface; and
    the raised surface of the first interface extends parallel to the sleeve axis of rotation.

5. The flow control device of claim 4, wherein the second interface includes a plurality of elongated recesses, each of the elongated recessed shaped to interface with a corresponding complementary-shaped raised surface of the first interface.

6. The flow control device of claim 1, wherein the second interface extends to or beyond the through hole on two sides of the through hole.

7. The flow control device of claim 1, wherein the actuating member further includes a male threaded portion that is concentric to the sleeve axis of rotation when the actuating member is connected to the sleeve and that is configured to interface with a corresponding female threaded portion of the manifold body.

8. The flow control device of claim 1, wherein the actuating member further includes a recessed drive feature shaped to interface with a tool so that the actuating member can be rotated about the sleeve axis of rotation via the tool.

9. The flow control device of claim 8, wherein the recessed drive feature is shaped to interface with a flat-bladed screw driver.

10. The flow control device of claim 1, wherein the actuating member has a elongated shape having a distal end portion and a proximal end portion, the second interface formed at the distal end portion, the proximal end portion protruding from the manifold body and shaped to be grasped to impart rotation to the actuating member to reorient the through hole relative to the fluid passage of the manifold body.

11. The flow control device of claim 10, wherein the proximal end portion includes a substantially rectangular tab.

12. The flow control device of claim 10, wherein the actuating member includes a feature that protrudes in a radial direction relative to the sleeve axis of rotation that interfaces with the manifold block to position the through hole relative to the fluid passage of the manifold body.

13. The flow control device of claim 1, wherein the actuating member is monolithically formed of a material stiffer than the sleeve elastomeric material.

14. The flow control device of claim 13, wherein:
    the actuating member material is formed of an acetal plastic; and
    the sleeve is formed of Santoprene™.

15. A flow control manifold assembly, comprising:
    a manifold body; and
    a plurality of the flow control devices of claim 1 mounted to the manifold body, each of the flow control devices operable to change a fluid flow rate of a fluid flowing through a corresponding fluid passage of the manifold body.

16. The flow control manifold assembly of claim 15, wherein for each of the plurality of flow control devices:

the sleeve further includes a second raised portion that encircles the sleeve and is shaped to provide a seal between the sleeve and the manifold body; and the first interface is configured as a female coupler and the second interface is configured as a male coupler.

17. The flow control manifold assembly of claim 16, wherein for each of the plurality of flow control devices:

the second interface extends within the sleeve along the sleeve axis of rotation to a position transverse to or beyond the through hole when the actuating member is connected to the sleeve; and the first and second interfaces accommodate the through hole such that the through hole is not in fluid communication with the first and second interfaces.

18. The flow control manifold assembly of claim 15, wherein for each of the plurality of flow control devices the actuating member is monolithically formed of a material stiffer than the sleeve elastomeric material.

\* \* \* \* \*